UNITED STATES PATENT OFFICE 2,546,139

VAT DYE AND INTERMEDIATE

Wilhelm Schmidt-Nickels, Little York, N. J., assignor to General Aniline & Film Corporation, New York, N. Y., a corporation of Delaware No Drawing. Application February 19, 1949,
Serial No. 77,437

5 Claims. (Cl. 260—362)

This invention relates to new and valuable vat dyestuffs containing a benzanthrone nucleus and intermediates therefor, and particularly to dyestuffs containing a benzanthrone nucleus reacted with a fluorene to form a fast olive dye.

In the prior art dyestuffs have been prepared by reacting benzanthrone $Bz_1$-carboxylic acid chloride with other compounds. None of these dyestuffs, however, are known to be similar in structure or properties to that which I have discovered.

The dyestuffs of my invention are obtained by reacting benzanthrone - $Bz_1$ - carboxylic acid chloride with fluorene followed by a ring closure. The resulting dyestuffs have the following general formula:

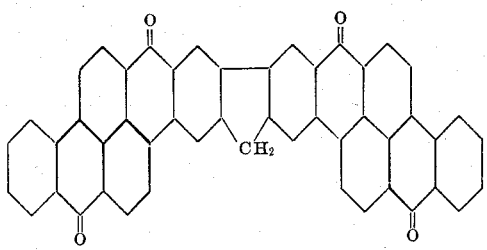

said compounds being unsubstituted or containing one or more nuclear substituents of the class consisting of halogen, alkyl, alkoxy acylamino, nitro, and sulfo groups.

The dyestuffs of this invention are prepared by reacting equal molar proportions of fluorene and benzanthrone $Bz_1$-carboxylic acid chloride together with anhydrous aluminum chloride in a solvent such as nitrobenzene. The resultant compound is then ring-closed by alkali fusion as with potassium hydroxide and sodium acetate. Since some of the product of this latter reaction may be in the leuco form, oxygen is passed through the material to convert all of the product to the dyestuff having the general formula indicated above. The first reaction is carried out at a temperature in the range 60 to 100° C. and preferably in the range 70 to 80° C. The alkali fusion may be accomplished at a temperature of about 200 to 250° C. and preferably about 230° C. The time of the first reaction is several hours while the alkali fusion takes only a few minutes. The dyestuffs obtained dye cotton and other cellulose fibers in the usual vat dye process an olive shade having excellent fastness to chlorine bleach.

A preferred method of preparing the dyestuffs of our invention is illustrated by the following example, wherein parts are by weight but it will be understood that the invention is not limited thereto and that variations and substitutions may be made within the scope of the appended claims.

A charge of 240 parts nitrobenzene 16.4 parts $Bz_1$-benzanthrone carboxylic acid chloride 55.2 parts anhydrous aluminum chloride 4.4 parts fluorene is stirred at 75–80° C. for 3 hours. The reaction product is poured into a little water containing 48 parts concentrated hydrochloric acid (35%). The nitrobenzene is then removed by steam distillation. The solid reaction product is filtered and for removal of possibly present benzanthrone-$Bz_1$-carboxylic acid extracted at 70° C. with a mixture of 144 parts of concentrated ammonia (28%) and 800 parts water. The residual ketone is filtered, washed neutral and dried. The cyclization of the obtained ketone is carried out as follows:

A charge of 200 parts potassium hydroxide and 20 parts anhydrous sodium acetate is heated to 230° C. at which temperature 3 parts of the ketone is introduced into the melt. After stirring at 230° C. for 5 minutes the mass is poured into 2000 parts water. Air is blown through the mixture until all the dyestuff which is partly present in its soluble leuco form of violet color is precipitated in its insoluble keto form. It is then filtered, washed neutral and dried.

A dyestuff paste can be made by the known method of dissolving the dyestuff in concentrated sulfuric acid and pouring the solution into water. The product dyes cotton from a hydrosulfite vat a strong olive shade of excellent chlorine fastness.

This reaction may be represented by the following scheme:

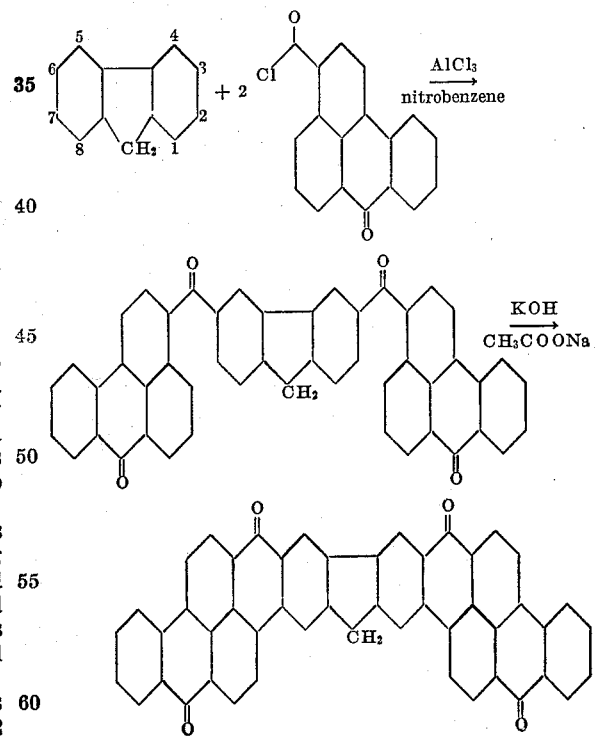

Similar dyestuffs are obtained by employing, instead of fluorene and benzanthrone Bz₁-carboxylic acid chloride in the foregoing example, equivalent quantities of nuclear substitution products of either one or both of these intermediates containing one or more alkyl groups apiece. Alternatively, the compound obtained by the example, either unsubstituted or containing alkyl substituents may have other substituents, introduced by the known procedures such as halogen, alkoxy nitro, sulfo and acylamino groups. Substituent alkyl groups in the original intermediates of course may not be present in positions to block the reaction and ring closure (4 in the benzanthrone and 2,3,6,7 in the fluorene). It will be understood that such groups as halogen groups present in the original intermediates might not withstand the drastic conditions of the reactions and if these substituents are desired, they may be introduced after the dyestuff has been formed by procedures customarily used for introducing such substituents into vat dyestuffs of the benzanthrone series.

If desired, olive vat dyestuffs of this invention can be converted into the alkali metal salt of the sulphuric acid ester of the corresponding leuco compound by the usual methods, for example, by reduction of the dyestuffs with a hydrogen liberating metal such as iron or zinc, preferably accompanied by a minor amount of copper, in a mixture of chlorosulfonic acid and pyridine followed by drowning of the reaction mixture in an aqueous alkali metal carbonate solution and salting out of the resulting leuco ester salt after removal of the pyridine by distillation. The resulting leuco sulphuric acid ester salts yield shades having color and fastness properties similar to those obtained by vat dyeing processes from the original dyestuffs, upon application by printing or dyeing of the material and development of the color by treatment with an acid oxidizing bath.

I claim:

1. A new composition of matter selected from the class consisting of a compound having the following formula

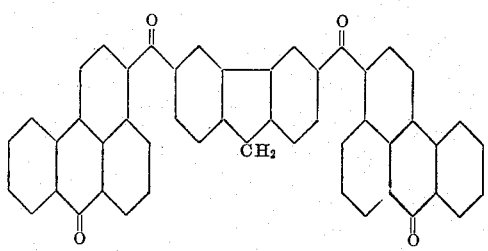

and

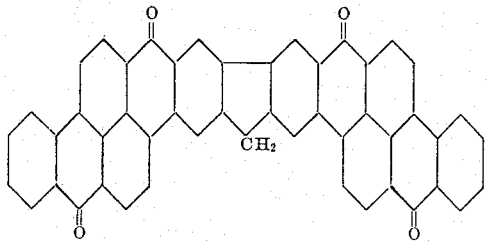

and nuclear alkyl, halo, alkoxy nitro, sulfo and acylamino derivatives thereof.

2. A vat dyestuff having the following formula:

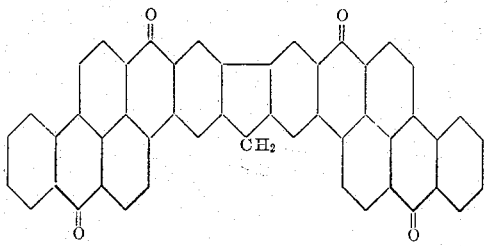

3. An alkali metal salt of the sulphuric acid ester of the leuco compound of the dyestuff defined in claim 2.

4. A process for preparing an olive vat dyestuff of the benzanthrone series which comprises reacting two moles of benzanthrone-Bz₁-carboxylic acid chloride with one mole of fluorene at an elevated temperature and subsequently ring closing the ketone thus formed.

5. A compound having the following formula

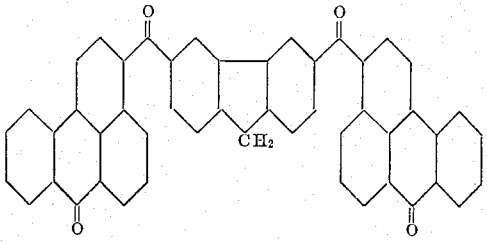

WILHELM SCHMIDT-NICKELS.

No references cited.